United States Patent
Czaja et al.

(10) Patent No.: US 7,486,643 B2
(45) Date of Patent: Feb. 3, 2009

(54) LEGACY-COMPATIBLE SIGNALING EXTENSION METHOD FOR BROADCAST/MULTICAST SERVICE INDICATIONS

(75) Inventors: Stanislaw Czaja, Cardiff, CA (US); Feng Qian, Mission Viejo, CA (US)

(73) Assignee: VIA Telecom Co., Ltd. (KY)

( * ) Notice: Subject to any disclaimer, the term of this patent is extended or adjusted under 35 U.S.C. 154(b) by 533 days.

(21) Appl. No.: 10/955,241

(22) Filed: Sep. 30, 2004

(65) Prior Publication Data

US 2005/0259622 A1 Nov. 24, 2005

Related U.S. Application Data

(60) Provisional application No. 60/507,610, filed on Sep. 30, 2003.

(51) Int. Cl.
*H04B 7/216* (2006.01)
(52) U.S. Cl. .................... 370/335; 370/390
(58) Field of Classification Search ............ 370/335; 455/458, 567
See application file for complete search history.

(56) References Cited

U.S. PATENT DOCUMENTS

2005/0054331 A1* 3/2005 Balachandran et al. ... 455/414.1

OTHER PUBLICATIONS

3GPP2, Oct. 27, 2000, cdma2000 High Rate Packet DAta Air Interface Specification, pp. 9-33, 9-57, 9-63, 9-64, and 9-78.*

* cited by examiner

*Primary Examiner*—Lester Kincaid
*Assistant Examiner*—Steven Lim
(74) *Attorney, Agent, or Firm*—Jaquez & Associates; Martin J. Jaquez, Esq.; William C. Boling, Esq.

(57) ABSTRACT

A method of extending, for enabled stations, the number of information states conveyed by a signal employed by legacy (non-enabled) stations. The additional information states may convey a Broadcast/Multicast Service (BCMCS) Indication by means of tristate modulation, including binary phase shift keying plus zero amplitude. A signal, such as a quick paging (QP) message, is selected because legacy receivers combine subunits of the message before the data content is determined. Complementary modulation is applied to the subunits, such that legacy combining renders the message information indistinguishable from harmless messages, yet distinguishable as a distinct additional information state in a legacy receiver. For example, a legacy receiver cannot distinguish a new QP message from a "zero" signal, due to application of inverse BPSK to the subunits. An enabled station may thus detect new information, such as a BCMCS Indicator, in a manner that is compatible with legacy stations.

20 Claims, 2 Drawing Sheets

FIG. 4 Summary

| | A | B | C | D | Legacy | Enabled |
|---|---|---|---|---|---|---|
| | | | | | BPSK Modulation for Subunit / Information State Detected By: | |
| 414 | + | + | + | + | On | a |
| 416 | 0 | 0 | 0 | 0 | Off | Off |
| 418 | - | - | - | - | Invalid/"On" | b |
| 420 | + | - | + | - | "Off" | c |
| 422 | - | + | - | + | "Off" | d |
| 424 | - | + | + | - | "Off" | c' |
| 426 | + | - | - | + | "Off" | d' |

FIG. 5 "Tristate"

| | A | B | C | D | Legacy | Enabled |
|---|---|---|---|---|---|---|
| 414 | + | + | + | + | On | a |
| 416 | 0 | 0 | 0 | 0 | Off | Off |
| 418 | - | - | - | - | Invalid/"On" | b |

FIG. 6

| | A | B | C | D | Legacy | Enabled |
|---|---|---|---|---|---|---|
| 414 | + | + | + | + | On | a |
| 416 | 0 | 0 | 0 | 0 | Off | Off |
| 420 | + | - | + | - | "Off" | c |
| 422 | - | + | - | + | "Off" | d |

FIG. 7

| | A | B | C | D | Legacy | Enabled |
|---|---|---|---|---|---|---|
| 414 | + | + | + | + | On | a |
| 416 | 0 | 0 | 0 | 0 | Off | Off |
| 418 | - | - | - | - | Invalid/"On" | b |
| 420 | + | - | + | - | "Off" | c |
| 422 | - | + | - | + | "Off" | d |

FIG. 8

| | A | B | C | D | Legacy | Enabled |
|---|---|---|---|---|---|---|
| 414 | + | + | + | + | On | a |
| 416 | 0 | 0 | 0 | 0 | Off | Off |
| 418 | - | - | - | - | Invalid/"On" | b |
| 424 | - | + | + | - | "Off" | c' |
| 426 | + | - | - | + | "Off" | d' |

LEGACY-COMPATIBLE SIGNALING EXTENSION METHOD FOR BROADCAST/MULTICAST SERVICE INDICATIONS

CROSS REFERENCE TO RELATED APPLICATIONS

This application claims priority under 35 USC 119 to U.S. Provisional Application 60/507,610 by the same inventors, entitled "Method and Apparatus for Signaling Presence of a Broadcast/Multicast Signal (BCMCS) Indicator in a Wireless Communication System," filed Sep. 30, 2003, the contents of which are hereby incorporated in their entirety by reference.

BACKGROUND

1. Field

This application generally relates to the field of wireless communication systems, and more particularly to signals and protocols to enhance data transmission efficiency in such systems.

2. Related Art

The subject matter set forth herein is applicable to wireless communication systems generally. However, it has been developed primarily in the context of cellular telecommunication systems, which facilitate high-speed connectivity and data and voice transport on both point-to-point and point-to-multipoint bases. First-generation (analog) and second-generation (digital) cellular networks were used primarily for communicating voice traffic via mobile cellular telephones, and thus maintained a focus on access methods for the efficient transport of voice information. With the rising popularity of the Internet, a third-generation (3G) wideband multimedia cellular network has been proposed that transports both voice and data at much higher speeds than were previously available using the first and second generation wireless networks.

A Third Generation Partnership Project 2 (3GPP2) has been established by industry groups for the purpose of defining specifications to transition current code-division multiple-access (CDMA) wireless networks to the third generation, which is commonly referred to as CDMA2000. One such specification may be referred to as "CDMA2000 1× Revision D" (which may also be referred to as "CDMA2000 1× Rev D," "cdma2000 Release D," "IS-2000-D", or "IS-2000-Rel. D"). The CDMA2000 1× Rev D specification, available from the 3GPP2, is incorporated by reference herein in its entirety for its teachings on communications protocols used in 3G wireless communications systems.

Many proposals of communication protocols for use in CDMA2000 Release D have been submitted to the 3GPP2, including protocols for both forward link transmissions from a base station (BS) to a mobile station (MS), and for reverse link transmissions from an MS to a BS. A relatively new feature that is desired involves multicasting signals from a base station (BS) to a select group of mobile stations (MSs) concurrently. To effect this feature, it is helpful to notify or "wake up" the typically "sleeping" MSs in time to receive the multicast signal. Proposals have recently been set forth that would incorporate one or more Broadcast/Multicast Service (BCMCS) Indicators into a quick paging (QP) channel (QPCH). The QPCH already exists in systems that accord with earlier versions of CDMA.

FIG. 1 illustrates some salient features of a quick paging channel. In a CDMA system, a QPCH may be defined by a particular orthogonal code of length 64 (for example). A QPCH frame 102 is 40 mS long, and typically aligned with (two) 20 mS voice frames. A QPCH frame 102 is typically divided to include about 192 distinct time slots, each having a known relationship to the 20 mS system timing, which in turn bears a known relationship to the serving BS pilot signal. Assuming 192 such slots, 192 different MSs may each have a unique association with one such slot, readily permitting a QPCH frame to serve 192 different users concurrently. However, with hashing protocols, particular slots may be concurrently associated with (and thus serve as paging indications for) a plurality of different MSs. Such hashing practices are well understood, but for simplicity this extension will not be set forth in detail herein. Accordingly, the QPCH slots will in general be treated herein as each associated uniquely with a particular MS, with the understanding that the association may be extended by procedures such as hashing.

Numerous MSs are associated with particular slots in the representative 40 mS QPCH frame 102. Each MS analyzes a signal, at least in the appropriate corresponding slot of the QPCH frame, to determine the information contained in such QPCH message. For legacy MSs, the signal is simply on/off. A signal present on the QPCH at the appropriate time provides a page indication (PI), after receipt of which a legacy receiver will proceed to decode a further message that provides details relevant to such paging. An absence of signal at the appropriate time is an "off" signal, and directs a legacy MS to do nothing other than wait for the next page. In FIG. 1, fifteen different slots are illustrated in the "on" state, i.e., are being actively transmitted, in each frame. This is represented by the fifteen small vertical black boxes 104 (in QPCH frame 102) and 108 (in QPCH frame 106).

In order to enhance reliability, the entire QPCH frame 102 is repeated a second time as duplicate QPCH frame 106. The fifteen actively transmitted slots 108 in the duplicate QPCH frame 106 are disposed in the same relative position with respect to timing of the frame 106 as are the fifteen slots in the first frame 102. Identical relative locations are maintained for convenience and convention.

The proposals thus far presented for adding broadcast/multicast service (BCMCS) indications to the QPCH channel have generally included reserving a few slots within each frame for indicating a multicast for some number of MSs. Each slot would be shared at least with other MSs in the same multicast "group," and the number of slots available would be distributed among the MSs associated with the QPCH frame to provide all BCMCS indications for such MSs. Thus, for example, a particular MS may be associated with a quick page (QP) message slot at a unique location 110, a multicast slot at a location 112 (shared with some other MSs), and a broadcast slot at a location 114 (the broadcast slot is shared with all MSs associated with the QPCH frame).

These proposals are relatively easy to implement in conjunction with less-capable "legacy" MSs, because the system controller or BS need only avoid assigning legacy MSs to the slots reserved for the new BCMCS Indicator features. However, they have been shown to impair the standby time of idle devices. It has been shown that shared BCMCS Indicators will most likely significantly reduce the standby operating time of an enabled receiver. See, e.g., "BCMCS Indicator," contribution C30-20031208-xxx to 3GPP2 by Czaja and Qian, the contents of which are hereby incorporated in their entirety by reference. First, most MSs need only about 2.5 mS to wake up, examine a signal, and go back to sleep. Therefore, a need to look at two different locations within a QPCH frame, such as locations 110 and 112, will require waking up twice as often. Because the RF circuitry consumes approximately 50% to 75% of the MS power when it actively monitors an assigned paging slot, it is useful to minimize the amount of time that the MS is active.

Additionally, only a relatively few multicast slot locations are provided. As such, MSs from different multicast groups will share the multicast locations. Consequently, many MSs would receive a BCMCS indication that is not intended for them, requiring such MSs to wake up and decode additional messages. Only after such activity would the awakened MSs determine that the indication is not intended for them. The unnecessary additional waking/receiving time will reduce a standby time capacity of enabled MSs.

The proposals that have been set forth for reserving slots in the QPCH for BCMCS Indicators reflect a need for such extended signaling capability for newer MSs, while preserving compatibility with legacy stations (whether MS or BS). The method set forth herein addresses that need.

SUMMARY

A method of extending signaling capacity between newer stations in a wireless communication system, while maintaining compatibility with "legacy" stations lacking such signaling capacity. To provide BCMCS Indications in a CDMA system that are specific to particular MSs, messages on a Quick Paging (QP) Channel (QPCH) may be extended from binary on/off information states to tristate +1/off/−1 states by imposing binary phase shift keying (BPSK) modulation on the messages. Variations of the method are adaptable to substantially extend signaling capacity for new stations, while retaining compatibility with legacy stations, for many different signals.

In one aspect, the method includes selecting and dividing a legacy signal unit, identifiable by a legacy station as one of two or three states, into subunits, and superimposing one of two inverse phase modulations + and − to each of the subunits to define multiple phase modulation combinations for the subunits. The method continues by identifying a plurality of conditionally distinctive modulation combinations, which are indistinguishable from each other in legacy stations due to legacy processing, but are distinctive to enabled stations. Finally, the method conveys the plurality of conditionally distinctive subunit combinations within messages to convey distinct information states to an enabled station. A version of this method may be configured specifically for receiving stations, and another for transmitting stations.

The method may further include identifying, as an information state in a legacy station, an absence of the legacy signal unit at a predetermined time. The method may also include distinguishing the conditionally distinctive subunit modulation combinations, plus a zero amplitude combination, as three distinct states when received in an enabled receiver, while the same three distinct states are identifiable as no more than one state when received in a legacy receiver. The signal units may be legacy quick paging (QP) messages within a quick paging channel (QPCH) frame. In that event, the method may further include time dividing a first legacy QP message directed to a particular mobile station (MS) into subunits, and phasing substantially a first half of the QP message subunits inverse to substantially a second half of the QP message subunits to form the conditionally distinctive modulation combinations. If so, then the method may further include differently modulating a second legacy QP message disposed in a subsequent QP frame of the QPCH and directed to the particular MS, to establish at least one additional conditionally distinctive state that is distinguishable in an enabled receiver but indistinguishable in a legacy receiver. In any event, at least one of the conditionally distinctive states may provide a broadcast and/or multicast service indication if conveyed to an enabled receiver, and provide no identified indication if conveyed to a legacy receiver.

BRIEF DESCRIPTION OF THE DRAWINGS

Embodiments of the disclosed method and apparatus will be more readily understood by reference to the following figures, in which like reference numbers and designations indicate like elements.

FIG. 4 is a table illustrating relationships between alternative modulation combinations as they are detectable in legacy receivers, versus possibilities for detectability in enabled receivers.

FIG. 5 is a subset of the table of FIG. 4 showing tristate modulation patterns.

FIG. 6 is a subset of the table of FIG. 4 showing quadrastate modulation patterns.

FIG. 7 is a subset of the table of FIG. 4 showing a pentastate modulation pattern.

FIG. 8 is a pentastate modulation pattern subset of the table of FIG. 4 that is in some ways mutually exclusive with the patterns of FIG. 7, in which the order of the symbols in the "duplicate" frame is reversed.

DETAILED DESCRIPTION

Overview

Figure 1:
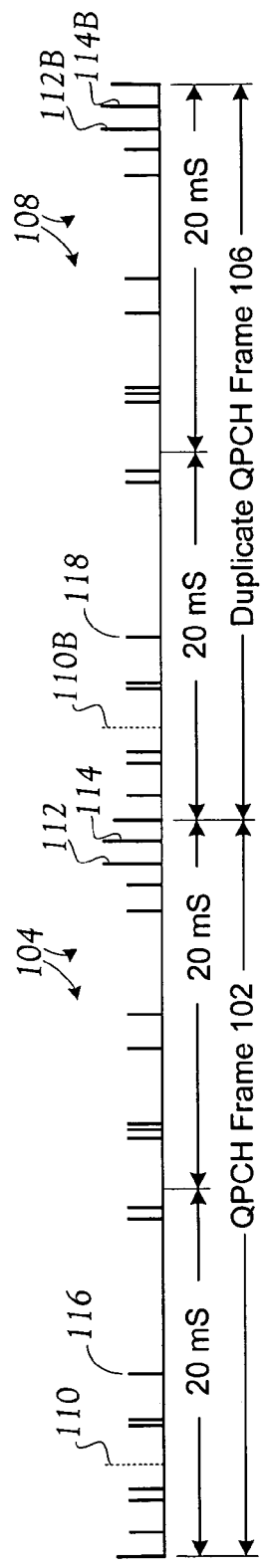
FIG. 1 is a timing diagram representing legacy quick paging (QP) messages disposed within a QP channel (QPCH) frame pair.

Some communication systems, such as fiber optic or microwave trunks, may be placed under the control of a single entity for purposes of upgrading. Thereby, all components of such system may be modified concurrently, which provides great flexibility in the changes that may be implemented to improve performance. In many other systems, such as cellular telecommunication systems, ownership of system components may be distributed between a variety of entities, or it may be inconvenient to concurrently upgrade all of the components in an installed base.

Thus, it is often inconvenient to upgrade or modify all existing system components at one time. Nonetheless, it is desirable to enhance the capabilities of new components as they are added to the system. Consequently, it will be very useful to add new features to new system components in such a way that such new system components are "backward compatible." Considering transceiver stations in a cellular wireless communication system (e.g., mobile stations or "MSs" and base stations or "BSs"), it is clearly desirable for new features in "enabled" MSs to be useable when in communication with BSs that are also enabled to support such features. An "enabled" station is one that is configured to use the new signal. An enabled transmitting station includes modules configured to appropriately generate and transmit the new signal, while an enabled receiving station includes modules configured to detect and distinguish the new signals, and to perform appropriate procedures in response to the new signals. For communications with a legacy station, it is typically desirable for enabled MSs to perform as expected for a legacy MS, and conversely for enabled BSs to perform as expected for a legacy BS.

Enabling new features in a communication system often requires communication of new signaling messages between stations. However, because the available communication spectrum or "bandwidth" is limited, it is less than optimal to simply add new signals that consume additional bandwidth. An alternative way to obtain new signal message capabilities is to modify existing messages. Such alternative is attractive from the standpoint of providing new signaling capability without significantly increasing bandwidth usage, but may complicate backward compatibility.

Quick Paging Channel (QPCH) Extension to Indicate Broadcast/Multicast Service (BCMCS)

A quick paging (QP) channel (QPCH) is supported in legacy CDMA stations. QP messages to numerous different MSs (about 190) may be disposed in paired QPCH frames of 40 mS duration. The QP messages are good example of a "legacy" signals that may be modified to convey additional signaling information without significantly increasing system bandwidth usage (i.e., spectrum usage). A generally applicable method is described by which enabled stations may employ modified versions of such legacy signals to provide enhanced signaling capacity between enabled stations, while functioning as expected in communications with legacy stations. The QPCH signaling capability between enabled stations may be extended using the general method, or using a more specific tristate extension method, or both.

Because the RF circuitry consumes approximately 50% to 75% of the MS power when it actively monitors assigned paging slot, it is important to minimize the time the MS receiver is active. The operation of the average MS while monitoring the QPCH channel includes the following: (i) calculate position of preassigned PI indicator as an offset in symbols from the beginning of 20 ms frame; (ii) wake-up before the calculated PI position just enough to settle the radio frequency (RF) phase locked loop (PLL) and automatic gain control (AGC); and (iii) correct timing error, etc. Steps (i)-(iii) take about 1 to 2 ms. Next, the MS will (iv) de-spread and decode the paging indication (PI) message or symbol, taking less than a further 1 ms. Next, the MS will (v) turn OFF all RF and receive circuitry, make relevant decisions, and perform any housekeeping that is needed (such as calculating the next wake-up period, etc.) in the background. Thus, the average MS is actively monitoring the QPCH channel within each 40 ms QPCH frame for approximately 4 ms.

Figure 2:
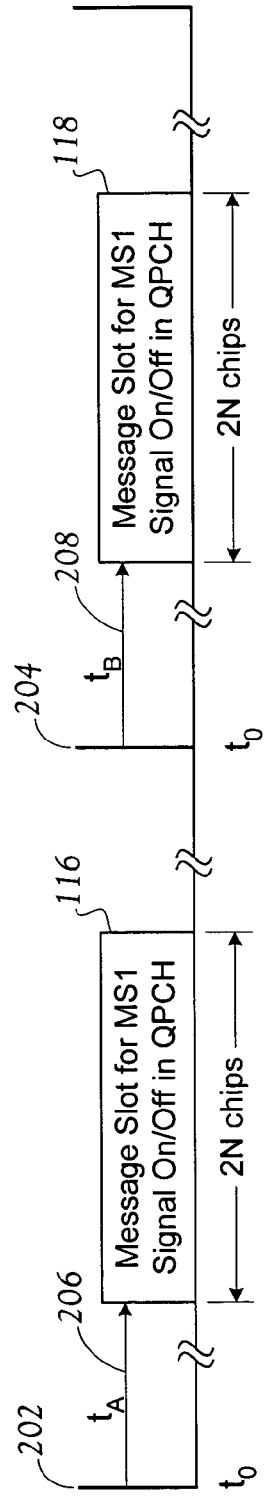
FIG. 2 is a block signal illustration of QP messages, in two QPCH frames, which are directed to a particular legacy mobile station (MS).

FIG. 2 shows expanded details of the representative pair of QP messages 116 and 118 of FIG. 1, both of which are directed to a particular MS (for convenience denoted MS1). A reference instant 202 identifies $t_0$, the beginning of a first QPCH frame 102, and reference instant 204 is likewise the beginning, $t_0$, of the second QPCH frame 106. Each of the QP messages 116 and 118 are 2N chips in duration, where N may for example be 64 chips. The QPCH channel may accordingly be defined by a length 64 orthogonal code, and each QP message may comprise two code lengths. The QP message is repeated in the two QPCH frames 102 and 106 for time diversity, to facilitate reliable detection, thereby forming the QP message "pair" 116 and 118. QP message 116 begins a time $t_A$ after $t_0$ 202, while QP message 118 begins a time $t_B$ after $t_0$ 204. As noted previously, it is generally convenient to have $t_A = t_B$, so that the particular MS to which the QP messages are directed need maintain only one time reference value, though in principle such equality is unnecessary so long as the target MS knows the locations. In any event, the two QP messages are redundant, in legacy systems, providing identical information to the same MS as reinforcement, rather than providing new information.

Particular QP messages may be directed to more than one MS. MSs may be assigned to particular QP slots according to a hashing function, or otherwise, if more MSs need to be served than can be handled by the available QPCH. These techniques are well known for addressing more MSs, with well understood tradeoffs with respect to absolutely unique addressing. However, for convenience when discussing relationships of MSs to QPCH slots herein, the relationship will be treated as one-to-one. The fact that a message may in practice be read by a few MSs instead of just one makes no difference, because the message is still directed to "a particular MS." Other MSs that may be decoding the same message will receive information not intended for them, as they will discover upon decoding detail messages.

In at least some legacy MSs, a signal present on the QPCH (i.e., following the QPCH length-64 orthogonal or Walsh code) and extending for 2N (e.g., 128) chips beginning at the time $t_A$ 206 after $t_0$ 202, is interpreted as indicating a QP message for the particular MS having $t_A$ 206 offset from $t_0$ 202. The absence of a signal on the QPCH at that precise time is interpreted as an "off" QP message for the same MS. Thus, two signal conditions, present and absent, distinguish two information states (on and off) for the QP message with respect to the particular MS.

Figure 3:
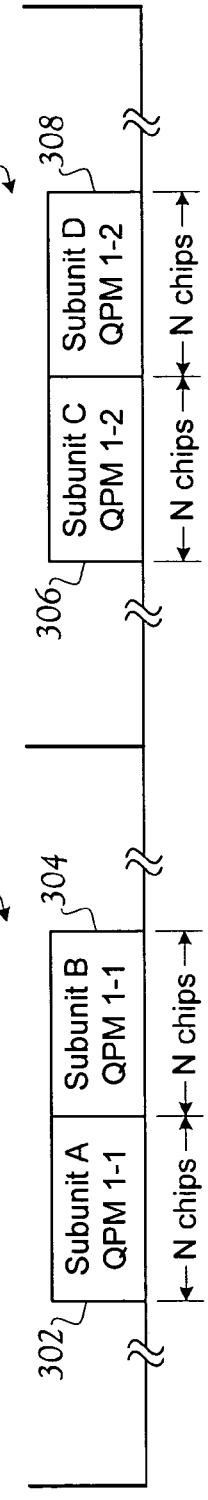
FIG. 3 illustrates representative modifications to the QP messages shown in FIG. 2 for conveying new information to enabled MSs in a manner compatible with legacy MSs.

FIG. 3 illustrates a further expansion of the QP message 116 to subunit A 302 and subunit B 304, as well as expansion of QP message 118 to subunit C 306 and subunit D 308. Each of the subunits is N chips in duration. To increase the certainty of detection, legacy stations will average the signal detected during subunit A 302 with the signal detected during subunit B 304 to obtain an improved estimate for QP message 116. Similarly, message subunits C 306 and D 308, will be averaged to obtain an improved estimate of the presence of QP message 118. For the same reason, some legacy MSs may similarly average the entire QP message 116 with the QP message 118.

Each of the subunits A, B, C and D may be modulated individually in newer MSs that are enabled for signaling enhancement. For example, binary phase shift keying (BPSK) signaling may be applied to each of the subunits. Upon demodulation, each received subunit will be recognized in an enabled MS as having a + or − phase, if present at all. FIG. 4 sets forth a table correlating alternative patterns of BPSK for subunits A, B, C and D with information states as they may be recognized in a legacy MS (column 402), as well as the information states that may (optionally) be recognized in a new enabled MS (column 404). FIG. 4 is a summary of relevant possibilities, and includes modulation patterns that are, for some purposes, mutually exclusive. The modulation of the subunits A, B, C and D is indicated in columns 406, 408, 410 and 412, respectively. FIG. 4 does not illustrate all combinations of state that are possible (there would be 17), but illustrates the most relevant possibilities, including those that may, depending upon legacy processing, be indistinguishable in legacy receiving stations from a harmless information state.

Rows 414 and 416 illustrate the patterns used in legacy stations. As may be seen in row 414, if all four subunits are modulated with + BPSK modulation (zero degrees phase shift), a legacy MS will recognize an "on" information state. An "on" state is treated, in legacy MSs, as a paging indication (PI), in response to which the MS will take appropriate action to obtain details of the page. An enabled MS may recognize this combination as a first possible information state "a."

Because the signal might be transmitted from a legacy BS, it may be convenient for enabled MSs to respond to the state "a" identically as would a legacy MS, i.e., by recognizing the message as a PI and proceeding to obtain details of the page elsewhere. The BPSK modulation pattern indicated in row 414 is essentially the same as an unmodulated QP "on" signal transmitted by a legacy BS. The modulation indicated in row 416, 0 0 0 0, will be interpreted as an "off" information state to both enabled and legacy receiver stations.

The modulation pattern of row 418, in which all four subunits A-D are uniformly modulated with −1 BPSK, is one way to extend the signaling capability of QPCH messages. Allowable states may be limited to all four subunits A-D having the same value, +1 (row 414), 0 (row 416) or −1 (row 418), as illustrated in FIG. 5. Limiting the allowable modulation pattern and information states to those shown in FIG. 5 effectively changes the signaling protocol from binary on/off signaling, in legacy stations, to tristate +1/0/−1 BPSK signaling in enabled stations. Extending on/off signaling to tristate signaling causes very little reduction in detection probability for enabled receiving stations, yet adds a further signaling state recognizable to enabled receiving stations. It is compatible with coherent legacy MSs, because the pattern is invalid in such legacy MSs and, as such, will be ignored. In non-coherent legacy MSs, however, it may be interpreted as the presence of a signal, or "on." In enabled MSs, the row 418 modulation pattern will be recognized as an information state "b," which may, for example, be interpreted as a BCMCS Indicator. Thus, an enabled MS may respond to patterns 414 and 416 just as a legacy MS would, yet may further recognize and respond to pattern 418 as conveying an added information state that is essentially unrecognizable by legacy MSs.

However, further signaling information is often needed to assist with the implementation of additional features. Signaling capabilities, for signals such as QP messages, may be extended in a manner that is compatible with legacy stations by taking advantage of processing performed by such receivers to make additional information states indistinguishable from zero, or from other harmless information states. While the modulation pattern of row 418 is invalid for legacy MSs and should thus be ignored, there is some risk that such signal may be incorrectly interpreted as conveying an "on" information state, depending upon the phase discrimination ability of particular MSs. Non-coherent receivers are the most likely to interpret such negative phased signal as indicating an "on" state.

Due to inverse phasing of substantially half of the signal unit, the modulation patterns shown in rows 420, 422, 424 and 426 will be evaluated as an "off" information state in legacy stations that average the first and second subunits of QP messages before determining a content of the message. Thus, the inverted phasing is selected such that legacy processing will cause all four of these modulation patterns to be indistinguishable from another pattern (0 0 0 0). The pattern from which it is indistinguishable is either undetectable, or is recognizable to legacy stations as a harmless (e.g., "off") information state. Conveniently, the 0 0 0 0 pattern in a QP message pair constitutes instructions to legacy MSs to do nothing. As such, these patterns have a special advantage with regard to compatibility with legacy stations. The information states that may be conveyed by these patterns to an enabled receiver are indicated in column 404 as c, d, c' and d', respectively. For purposes of preferred embodiments, c and d are mutually exclusive with c' and d', as will be explained in more detail below in the description of FIGS. 7 and 8.

Both legacy and enabled receiving stations will realize increased detection probability by combining the QP message pairs (e.g., 416 and 418) transmitted in adjacent QPCH frames. In particular, the two messages provide time diversity for a fading channel, such that one of the pair may be received clearly while the other is not. Moreover, legacy protocols (according with earlier releases of the CDMA standards) have required the QP message in the second frame (e.g., message 418) to be identical to the corresponding message in the first frame (e.g., message 416). FIGS. 6 and 7 illustrate two subsets of potential modulation patterns that are compatible with legacy requirements, insofar as the first and second messages are identical. FIG. 7 shows a combination of modulation patterns that provides five different recognizable states to an enabled station. As compared with a tristate combination, a station enabled to recognize the patterns of FIG. 7 cannot simply combine message subunits, such as A and B or C and D, prior to decoding the information state. As such, some amount of effective detection capability is given up in order to obtain a larger number of useable information states.

FIG. 6 differs from FIG. 7 by omission of the row 418 pattern of modulation. If the invalid state (in legacy receivers) represented by the pattern of row 418 creates a significant risk of being incorrectly interpreted as an "on" or signal present state, and if such incorrect interpretation is to be avoided, then omitting that state from the set provided to enabled transmitting stations may be useful. Non-coherent receivers, in particular, may interpret the pattern of row 418 as an "on" information state, rather than ignoring it. If row 418 is omitted, then signal capacity may still be extended by recognizing other subunit modulation patterns. Two new patterns (rows 420 and 422) double the number of information states at a modest reduction in energy per bit (or detection probability) for enabled receiving stations. Legacy receiving stations will identify the new patterns as "off" messages due to the cancellation that will occur when the two subunits (or symbols) of each message are combined, at the signal level, prior to decoding. The tables of FIGS. 4-8 indicate "off" in quotations because the states are technically invalid, and are detected as "off" states only due to the processing applied by the legacy receivers. By omitting the modulation combination of row 418, "false positive" interpretation of new states by legacy MSs is made less likely. While such incorrect interpretation is relatively harmless in regard to QPCH messages, omitting a possibly ambiguous state may become more attractive for other signals in other channels, when the penalty for incorrect detection may be higher.

FIG. 8 is incompatible with QPCH requirements in legacy CDMA standards. As such, it appears not to benefit from combining the first message (e.g., 116) with the second message (e.g., 118) of a QP message pair. Furthermore, if it is desired to retain the advantage of time diversity provided by separating the two messages by significant time (e.g., 40 mS), then the modulation combination shown in FIG. 8 is mutually exclusive with modulation combination shown in FIG. 7. Thus, it is preferred to employ either the patterns of FIG. 7 or those of FIG. 8, but not both.

The modulation pattern combination illustrated in FIG. 8 is therefore not a first choice for extending signaling of the QPCH. However, in other channels, and with other signals, conditions may be different. An alternative channel and signal may be received by a coherent receiver according to some then-existing convention, including first and second messages M1 and M2, each having first and second parts A, B, C and D. Being coherent, some receivers may be configured to combine M1 with M2 prior to decoding, and may avoid combining subunits within the messages (i.e., may avoid combining A with B, or C with D), for example in order to be able to distinguish combinations "+ −" and "− +." Under such circumstances, it may be useful to reverse the BPSK values applied to A, B, as compared to C, D, so that "AB"="DC" rather than "AB"="CD." Such a configuration would cause the postulated receiver processing (M1 combined with M2) to effectively cancel the signal amplitude. Thus, the new modulation patterns of rows 424 and 426 would be indistinguishable from "off" in such a legacy receiver. For these patterns, then, "off" would be detected by legacy stations regardless of whether they combine first and second subunits (e.g., A and B together, and C and D together), first and second messages (e.g., 116 and 118 together), or both.

A quadrastate version of the alternative modulation combination of FIG. 8 may be formed by omitting row 418. Such omission may be desirable, in some circumstances, for similar reasons as are described above with respect to FIG. 6.

A note regarding extension to other types of signaling: QP message 0 0 0 0 is a harmless information state in legacy MSs, but when the method is applied to other signals, legacy receiving stations may simply be unable to detect zero amplitude messages. In such cases the new patterns are indistinguishable, for legacy stations, from an absence of signal. A zero amplitude message may not always be the same as an "off" indication. For example, unless sufficient information is predetermined about the expected "location" of a signal, then the absence of such a signal cannot be reliably detected, and thus cannot be said to convey information. However, in most relevant circumstances the expected signal timing will be known, and such knowledge will permit combining of signals prior to decoding.

As can be seen, the signaling capability of each QP message directed to a particular receiver may be extended from two states to three states (tristate) with little loss of detection capability. The signaling capability may be extended to four (quadrastate) or five (pentastate) states with a few dB loss of detection capability. Further extension is possible. Extension from two states to four states (quadrastate) reduces possible legacy incompatibilities. In particular, a broadcast/multicast service (BCMCS) Indicator may be conveyed to particular MSs by modulating a paging indicator (PI) message, or QP message. A quadrastate implementation may be used to provide signals for PI, BCMCS, and (PI+BCMCS).

All of the described alternatives (tristate, quadrastate and pentastate) provide at least one additional signaling state, for enabled stations, which is not available to legacy stations. The first new information state may be employed as a BCMCS Indicator that may be directed to a specific MS. The standby life of enabled MSs will benefit from such specificity, as compared for other proposals for conveying BCMCS Indicators via the QPCH. Due to the specificity, a minimal number of MSs will be directed to receive and decode irrelevant messages, in contrast to having one or a few shared BCMCS Indicators disposed within the QPCH frame. Moreover, there is no need for any MS to wake up more than once per QPCH frame to determine the contents of the current messages. All of the described alternatives, except the tristate alternative, are readily configurable to signal either paging indications (PIs), or BCMCS Indications, and even the concurrent combination of both. Some of the alternatives, of course, have yet further signaling capability. Thus, these alternatives provide the possibility of greatly extending the ability to direct individual MSs to attend to a large number of different types of "interrupts."

Specifically signaling to individual MSs (or a few hashed MSs) is generally advantageous compared to widely sharing signals. However, such specificity will incur a small penalty in bandwidth usage when all MSs must be notified concurrently, e.g. for a true broadcast. This penalty is very limited in practice, however, because BCMCS indications are transmitted only about every 10 seconds, and thus the duty cycle of such transmission will remain tiny.

Conclusion

The foregoing description illustrates exemplary implementations, and novel features, of a method of expanding the number of information states conveyed in signals between enabled communications stations, while retaining compatibility with legacy stations. Alternative implementations have been suggested, but it is impractical to list all such alternatives. As such, the scope of the presented invention should be determined only by reference to the appended claims, and should not be limited by features illustrated in the foregoing description except insofar as such feature is recited as a limitation in an appended claim.

While the above description has pointed out novel features of the invention as applied to various embodiments, the skilled person will understand that various omissions, substitutions, and changes in the form and details of the methods and systems illustrated may be made without departing from the scope of the invention. As particular, non-limiting examples, the communication need not be a CDMA system such as is described in the exemplary embodiment. MS (mobile station) and BS (base station) functionality are specifically indicated, but that is for a typical system. Both such stations are transceivers, and are for many purposes interchangeable. Moreover, messages on a quick paging channel (QPCH) were considered in detail. However, increased information states may be conveyed to enabled stations via almost any message, while retaining compatibility with legacy stations. Such messages need only be derivable from legacy messages by division into subunits, which are processed in legacy stations in such manner that a plurality of different combinations of modulation of such subunits is indistinguishable from a harmless signal in a legacy station, but distinguishable in an enabled station.

Each practical and novel combination of the elements described hereinabove, and each practical combination of equivalents to such elements, is contemplated as an embodiment of the invention. Because many more element combinations are contemplated as embodiments of the invention than can reasonably be enumerated explicitly herein, the scope of the invention may properly be defined only by the appended claims, rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element, insofar as possible without also encompassing the prior art.

What is claimed is:

1. A method of providing broadcast and multicast service (BCMCS) indication in a CDMA communication system without adding new channels while retaining compatibility between BCMCS indication enabled stations and non-enabled (legacy) stations, the method comprising:

a) selecting a quick paging channel (QPCH) employed in legacy stations to direct signaling messages to individual receiving stations by means of preassigned time division multiplexing (TDM) slots;

b) determining a TDM slot of the selected channel for messages directed to a particular mobile station (MS) that is intended to receive a BCMCS Indication; and c) phase modulating a message transmitted in the determined TDM slot such that processing the received signal in a legacy receiving station as on-off keying will not detect the message.

2. The method of claim 1, wherein step (c) includes imposing binary phase shift keying (BPSK) to the message.

3. The method of claim 1, further comprising dividing the TDM slot into a plurality of subunits for individual modulation differing between subunits.

4. A method of enhancing signaling between enabled stations in a communication system having an installed base of unenabled (legacy) stations, the method comprising:

a) selecting a signal unit that is communicated between legacy stations, and which is processed by legacy receiving stations by combining subunits of the signal unit prior to estimating a symbol content of the signal unit or the subunits;

b) configuring an enabled receiving station to distinguish information content of the subunits without first combining them;

c) receiving, in an enabled receiving station, a first example of the selected signal unit in which the subunits are modulated identically, and a second example of the selected signal unit, in which the subunits are modulated differently; and d) detecting, in the enabled receiver, the first example signal unit as indicative of a first information state, and the second example signal unit as indicative of a different second information state;

wherein legacy receiving station processing of a signal equivalent to the second example signal unit renders such signal unit indistinguishable from the first example signal unit.

5. The method of claim 4, wherein step (d) further comprises detecting a pattern of inverse phase modulations applied to the subunits.

6. The method of claim 4, wherein the received first signal unit is disposed at a predetermined time and channel, and has substantially zero amplitude.

7. The method of claim 6, wherein step (d) further comprises detecting, in the enabled receiving station, binary phase shift keying (BPSK) pattern applied to subunits of each of two separate signal units received in corresponding separate frames.

8. The method of claim 7, wherein legacy receivers are configured to expect the selected signal unit to be repeated identically at preassigned time-referenced slots in a plurality of corresponding frames.

9. The method of claim 8, further comprising determining that the second example signal unit is identically repeated in an adjacent frame.

10. The method of claim 8, further comprising determining that an inverted version of the second example signal unit is repeated in an adjacent frame.

11. A method of enhancing signaling between enabled stations in a communication system having an installed base of unenabled (legacy) stations, the method comprising:

a) selecting a signal unit that is processed in legacy receiving stations by combining subunits of the signal unit prior to estimating a symbol content of the signal unit;

b) phase modulating the subunits of the signal unit in two different patterns, including i) a first subunit modulation pattern identifiable by the legacy receiving stations as conveying an information state X, and ii) a distinct second subunit modulation pattern that is indistinguishable from the first subunit modulation pattern by the legacy receiving stations;

c) directing the information state X to an enabled receiving station by transmitting the selected signal unit modulated in accordance with step (b)(i); and d) directing an information state Y, which is not recognizable to the legacy receiving stations, to an enabled receiving station by transmitting the selected signal unit modulated in accordance with step (b)(ii).

12. The method of claim 11, wherein step (a) further includes selecting a signal unit that is a paging channel message.

13. The method of claim 11, wherein step (b)(i) includes modulating both subunits to zero amplitude, and wherein the step (b)(ii) includes modulating the first and second subunits by opposite polarity phase shift keying.

14. The method of claim 13, wherein the signal unit is directed to a particular receiving station, further comprising transmitting a further signal unit to the particular receiving station in a subsequent frame, including modulating subunits of the further signal unit in a pattern that is substantially identical to the modulation pattern of the first signal unit.

15. The method of claim 13, wherein the signal unit is directed to a particular receiving station, further comprising transmitting a further signal unit to the particular receiving station in a subsequent frame, including modulating subunits of the further signal unit in a pattern that is substantially inverted with respect to the modulation pattern of the first signal unit.

16. The method of claim 13, wherein step (a) includes selecting a QP channel (QPCH) message as the signal unit; step (b)(ii) includes modulating the subunits, which are of substantially equal duration, with opposite polarity BPSK; and step (d) includes transmitting the differently modulated subunits to an enabled receiving station, with information state Y being a broadcast/multicast service (BCMCS) indicator.

17. A method of indicating that broadcast or multicast services (BCMCS) are available for a mobile station (MS) in a CDMA telecommunication system, comprising:

a) identifying a slot in a frame of a quick paging channel (QPCH) that is preassociated with a particular MS;

b) preparing a message for such slot that is modulated with binary phase shift keying (BPSK); and c) transmitting the prepared message on the QPCH in the preassociated slot.

18. The method of claim 17, further comprising performing steps (a), (b) and (c) with respect to slots in two adjacent QPCH frames.

19. The method of claim 18, wherein step (b) includes preparing substantially identical messages for each QPCH frame.

20. The method of claim 19, further comprising modulating subunits of the prepared messages with differing BPSK modulation values.

* * * * *